United States Patent [19]

Osterwalder

[11] 3,955,445
[45] May 11, 1976

[54] SPEED REDUCING DEVICE

[76] Inventor: Jean-Pierre F. Osterwalder, 812 Cottage St., Vienna, Va. 22180

[22] Filed: Nov. 15, 1974

[21] Appl. No.: 524,230

[52] U.S. Cl. ................................................. 74/805
[51] Int. Cl.² .......................................... F16H 1/28
[58] Field of Search ............................. 74/804, 805

[56] References Cited
UNITED STATES PATENTS

| | | | |
|---|---|---|---|
| 1,392,508 | 10/1921 | Krohn | 74/805 |
| 2,250,259 | 7/1941 | Foote, Jr. | 74/805 |
| 2,481,627 | 9/1949 | Sharpe | 74/804 |
| 2,956,632 | 10/1960 | Forbush et al. | 308/189 X |
| 2,966,078 | 12/1960 | Wright | 74/805 |
| 3,037,400 | 6/1962 | Sundt | 74/804 |
| 3,552,812 | 1/1971 | Howe, Jr. | 308/189 R |

FOREIGN PATENTS OR APPLICATIONS

| | | | |
|---|---|---|---|
| 727,755 | 6/1932 | France | 73/805 |

*Primary Examiner*—Samuel Scott
*Assistant Examiner*—Lance W. Chandler
*Attorney, Agent, or Firm*—Frederick L. Bergert

[57] ABSTRACT

A speed reducing device which is capable of large speed reductions and torque multiplication in a single stage is disclosed. The device includes input and output shafts in axial alignment, together with a transformer gear component having primary and secondary gears which rotate together. The primary gear engages a fixed gear spline while the secondary gear engages a rotatable output gear spline. This combination of gears, together with an eccentric and counterweight mounted on the input shaft, provides a system having numerous advantages in the field of high-ratio mechanical power transmission.

10 Claims, 4 Drawing Figures

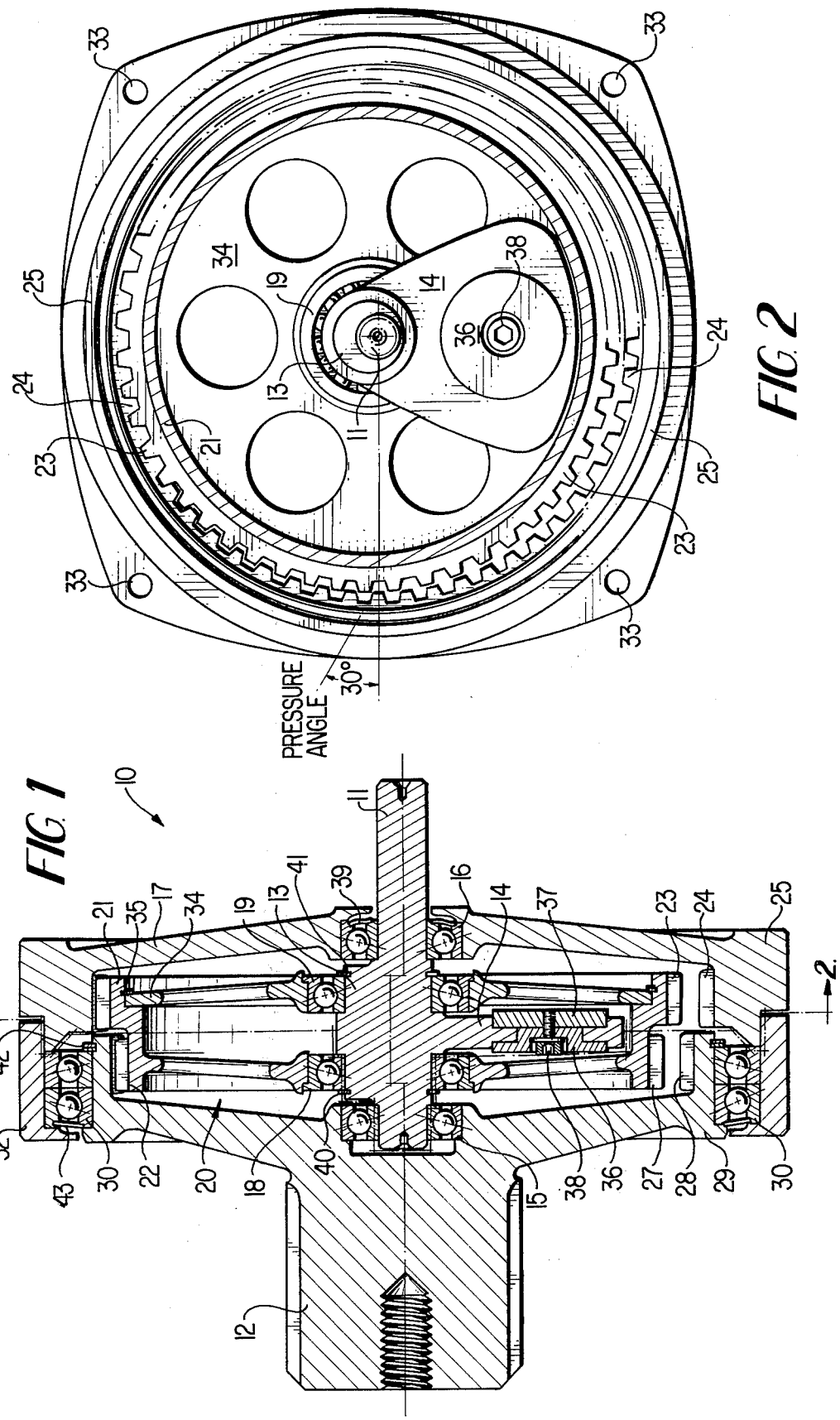

SPEED REDUCING DEVICE

BACKGROUND AND SUMMARY OF THE INVENTION

The present invention is concerned with a speed reducing and torque increasing device. More particularly, the present invention is concerned with a speed reduction gear arrangement which forms a dynamically balanced speed reducing system having an extremely short torque path. The system of the present invention is capable of large speed reductions in a single stage.

Many grear devices are known in the prior art for reducing the speed of an input shaft. In some speed reducing devices, particularly those developed earlier in the art having conventional involute gears, the gears are arranged so that only one or two teeth of each gear are in mesh at any one time, giving rise to various problems of vibration, gear wear and lost motion as these few teeth are required to absorb the entire shock of overload and stress on the gears.

In other known speed reducing devices, eccentric means is provided in combination with various types of inner ring assemblies, such devices providing for a larger number of teeth of each engaged gear to be in engagement at any time during rotation of the gear. Speed reducing devices of the latter type are described, for example, in U.S. Pat. No. 3,429,393 to Lorence. Such prior art devices, while representing an improvement over conventional involute gear systems, are also characterized by excessive noise and vibration in operation.

By the present invention, there is provided a speed reducing device which has been found to overcome many of the disadvantages associated with speed reducing systems of the prior art. The speed reducing system of the present invention operates on a novel concept to produce a large mechanical advantage between axial aligned input and output components. As a result of the characteristics inherent in this novel construction, the reduction gear system of the present invention offers numerous operating advantages in the field of high-ratio mechanical power transmission. The present system has been found to maintain an effeiciency of up to 98%, with the result that the present system offers definite advantages in the area of energy conservation.

The speed reducing system of the present invention includes input and output shafts which are in axial alignment. An eccentric member and a counterweight are carried by the input shaft. A fixed gear spline is positioned on the interior of the cover on the input side and a rotatable output gear spline is positioned on the interior of the casing on the output side. Between these two splines there is mounted for eccentric rotation on the input shaft a transformer gear component which includes a pair of spur gears having a common axis.

One gear of the pair of spur gears which comprise the transformer is in engagement with the fixed spline while the other gear is in engagement with the output spline. In accordance with the choice of nomenclature which denotes the interior gear component as a transformer, the first spur gear, in engagement with the fixed spline, is described herein as the primary transformer gear, and the second spur gear, in engagement with the output spline, is denoted the secondary transformer gear.

The primary gear has a smaller number of teeth than the fixed gear spline, with which the primary gear is in engagement, while the secondary gear has a smaller number of teeth than the output gear spline, with which the secondary gear is in engagement. Rotation of the input shaft with its eccentrically mounted transformer gear unit causes the primary and secondary gears to rotate in unison in a direction opposite to the direction of rotation of the input shaft. Such rotation of the primary and secondary gears, in turn, results in the output shaft being rotated in a direction which depends upon the relationship between the number of teeth of the primary and secondary gears. If the primary gear has a greater number of teeth than the secondary gear, the output shaft will rotate in the same direction as the direction of rotation of the input shaft, while the output shaft will rotate in a direction opposite to that of the input shaft when the primary gear has a smaller number of teeth than the secondary gear. The counterweight is formed integrally with or attached to the eccentric, with the counterweight extending from the input shaft in a direction diametrically opposite to the eccentric, thus providing a dynamically balanced system which is mandatory, particularly for high speed applications.

The eccentric and counterweight elements may be positioned on the input shaft with bearings on either side or, alternatively, the eccentric and counterweight may be located at the outer end of the input shaft with bearings located interiorly of the eccentric and counterweight along the input shaft. In this latter configuration, the eccentric and counterweight assume a cantilevered configuration in conjunction with the input shaft. The eccentric may be formed integrally either with the input shaft or with the combination of the input shaft and counterweight or, alternatively, the eccentric may be constructed separately and attached by bolts or similar means to the shaft as an assembled component. In a similar manner, the counterweight may either be formed integrally with the input shaft, or constructed separately and assembled onto the input shaft. As aother alternative, the counterweight and eccentric may be formed integrally as a single unit and pinned or keyed to the input shaft.

The primary and secondary transformer gears may be formed with either the primary or secondary gear having the greater number of teeth, with the direction of rotation of the output shaft relative to the direction of rotation of the input shaft varying accordingly, as previously discussed. These transformer gears may either be formed integrally or constructed separately and secured together by suitable means such as welding, screws, bolts, rivets or pins. A cavity for rotation of the counterweight may be located within the system either between the primary and secondary gears as an internal cavity or on one or both sides of the transformer gears as external cavities. Either a single or double cover or bell may be employed to cover the system.

The relationship of the rotatable output gear spline with the output shaft is such that these two elements may be formed integrally as a single piece or, alternatively, the two components may be constructed separately and assembled by bolts or other suitable means. It may be desirable in some situations to employ an output case rather than an output shaft. The use of an output case is advantageous in conjunction with the timing belt, V-belt, chain sprocket or cable drum. When an output shaft is employed, the shaft may be constructed with a keyway or slot, for example, or the shaft may be either splined, tapered to a conical shape along its longitudinal axis, or constructed as a hollow member with a splined interior surface. Either conventional bearings or peripheral bearings may be employed to allow rotation of the output shaft or case relative to the other components, although peripheral bearings are preferred, as described hereinafter.

The fixed gear spline may be formed integrally with the cover for the system or, alternatively, the fixed gear spline and cover may be constructed separately and secured to each other by bolts or similar securing means. The cover may be secured to an external casing or connected through bearings to the output portion of the system.

In the use of the speed reducing device of the present invention, speed reductions of the order of 40:1 up to several thousand :1 and greater are obtained in a single stage. A particularly distinctive feature of the speed reducing system of the present invention is the short, compact, stiff torque path, which extends in the present system from the fixed gear spline through the periphery of the primary and secondary gears to the output gear spline. The interrelationship of the various components results in a speed reducer of remarkable compactness and exceptionally high mechanical efficiency. Furthermore, there is virtually no noise or vibration in the present system, with the result that backlash is substantially reduced. Such advantages are attributable, at least in part, to the preferred 30 degree contact pressure angle at the gear teeth, such an angle providing distinct advantages over conventional teeth having contact angles such as 14½° and 20°.

A particularly unique feature of the present invention is that only a very small portion of the system comes under stress at any one moment. Because of the shortness of the torque generating path and because immediate support is provided at all possible points of stress existing around the periphery of the system, it is possible to eliminate metallic deflections and to reduce noise and vibration inherently associated with this phenomenon down to a bare minimum. Also, since the torque path is almost at the periphery of the system, taking advantage of the most favorable mechanical leverage, i.e., higher foot pound value, it is advantageous to have the bearing system also located at the periphery.

The peripheral bearing system, on which is mounted the output transmitting member of the system, is placed in a direct straight line with the lines of force transferred by the few gear teeth which are in mesh. Thus, this bearing system is well placed to support the stressed teeth in an adjacent position. Long mechanical linkages that would give and flex have therefore been eliminated.

The advantages obtained by the use of peripheral bearings versus a conventional shaft bearing include the fact that, if a peripheral bearing has a diameter four times greater than the diameter of a shaft bearing, then the loading capacity of the peripheral beaing is also at least four times greater than that specified for the shaft bearing. In this way, the output system using a peripheral bearing is rated for a much greater torque than would otherwise be possible with conventional shaft bearings. Also, large centilevered loadings can exist when a pully or a winch is mounted on the output system and these can be handled by a single peripheral bearing. Normally the same function would require two bearings mounted far apart on the same shaft. As a rule, single shaft bearings will tolerate no cantilevered loading. Furthermore, the peripheral bearing provides advantages of compactness and load distribution compared to conventional shaft bearings.

BRIEF DESCRIPTION OF THE DRAWINGS

The speed reducing system of the present invention will be more clearly understood from the following description of the preferred embodiments, taken in conjunction wth the accompanying drawings, wherein:

FIG. 1 is a longitudinal vertical section of a first embodiment of the speed reducing system of the present invention;

FIG. 2 is a transverse section taken along line 2—2 of FIG. 1;

DESCRIPTION OF THE PREFERRED EMBODIMENTS

Figure 4:
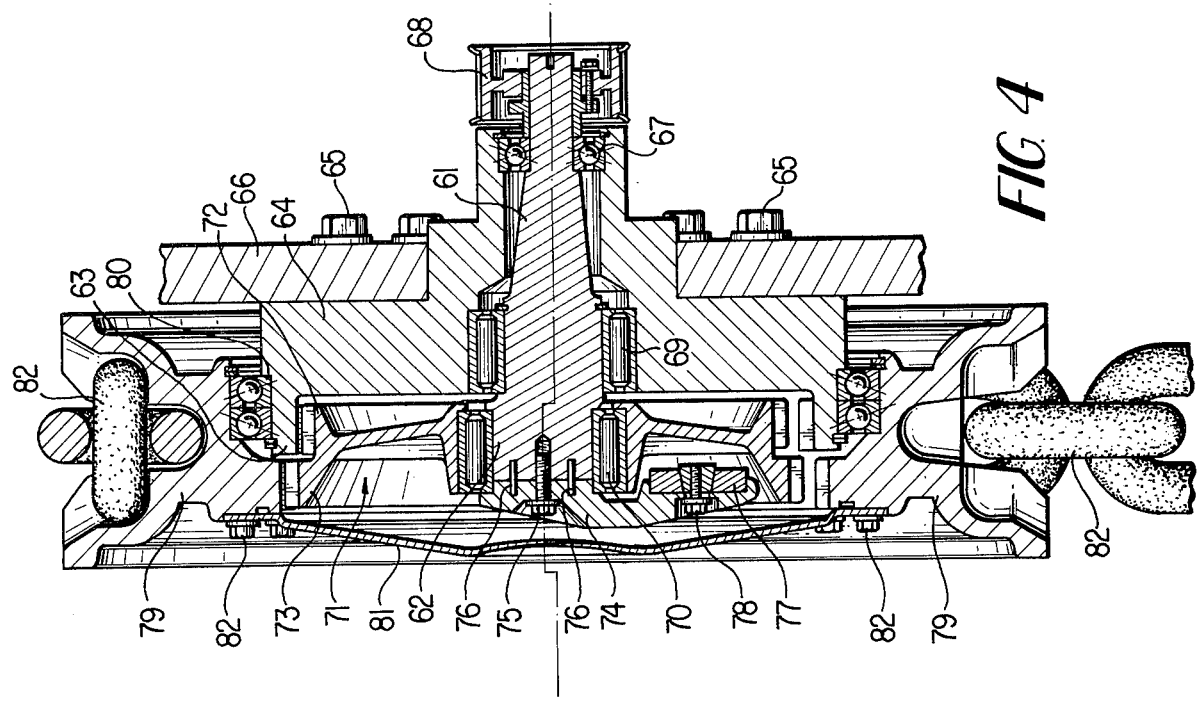
FIG. 4 is a longitudinal vertical section of a third embodiment of the present invention.

In the embodiment of the present invention as shown in FIGS. 1 and 2, there is provided a speed reducing system 10 which includes an input shaft 11 and output shaft 12 mounted in axial alignment. The input shaft 11 carries an eccentric 13 which is formed integrally with a counterweight 14 in a plane perpendicular to the axis of the input shaft 11. The center of gravity of the counterweight 14 lies on a line which extends from the input shaft 11 diametrically opposite to a line from the input shaft 11 to the center of gravity of the eccentric 13. Thus the moment of the counterweight 14 and of the eccentric 13 are 180° out of phase during rotation on the input shaft 11. The counterweight 14 is provided with removable weighted members 36, 37 secured to the counterweight 14 by means such as a locking screw 38. The removable feature of members 36, 37 allows the amount of weight carried by the counterweight 14 to be adjusted in order to balance the moments and thus achieve a dynamically balanced system.

The input shaft 11 is journaled for rotation by a pair of preloaded bearing assemblies 15 and 16, which journal the ends of the shaft 11 within openings in the interior of the output shaft 12 and cover 17, respectively. Bearing assembly 16 is provided with a bearing seal 39 which is an integral part of the bearing. A pair of preloaded bearing assemblies 18 and 19 journal the eccentric 13 in the central opening of a transformer gear component 20 which includes a primary 21 and secondary 22 gear. These bearing assemblies 18, 19 are retained by rings 40 and 41, respectively.

The primary gear 21 is provided with a series of teeth 23 which engage the teeth 24 of a fixed gear spline 25 which is formed integrally with the cover 17 of the gear casing 32. Thus the fixed spline 25 does not rotate during operation of the system 10. The secondary gear 22 is provided with a series of teeth 27 which engage the teeth 28 of a rotatable output gear spline 29. The output gear spline 29 is formed integrally with the output shaft 12 to provide an output transmitting member, and the output transmitting member is journaled in peripheral bearing assembly 30, which includes a pair of preloaded peripheral bearings. As an alternative arrangement, a single bearing which has been double preloaded during manufacture may be employed as the bearing assembly 30. The bearing assembly 30 is retained by a coiled spring 42 on the inner side. A dust seal 43 is provided as an integral part of the bearing on the outer side of the assembly 30.

As shown in FIG. 1, the transformer gear component 20 is provided as an integral piece having two different gears 21, 22, which rotate together in a free wheeling manner. Rotation of the input shaft 11 and eccentric 13 causes gears 21 and 22 to be rotated in unison at a reduced speed in a direction opposite to the direction of rotation of the input shaft 11.

Bearing assembly 30 fits between the system casing 3 and the output spline 29. The cover 17 is secured to the casing 32 by suitable securing means such as bolts which pass through bolt holes 33. An inner cover 34 is provided for the primary gear 21, the cove 34 being retained by spring ring 35.

Figure 3:
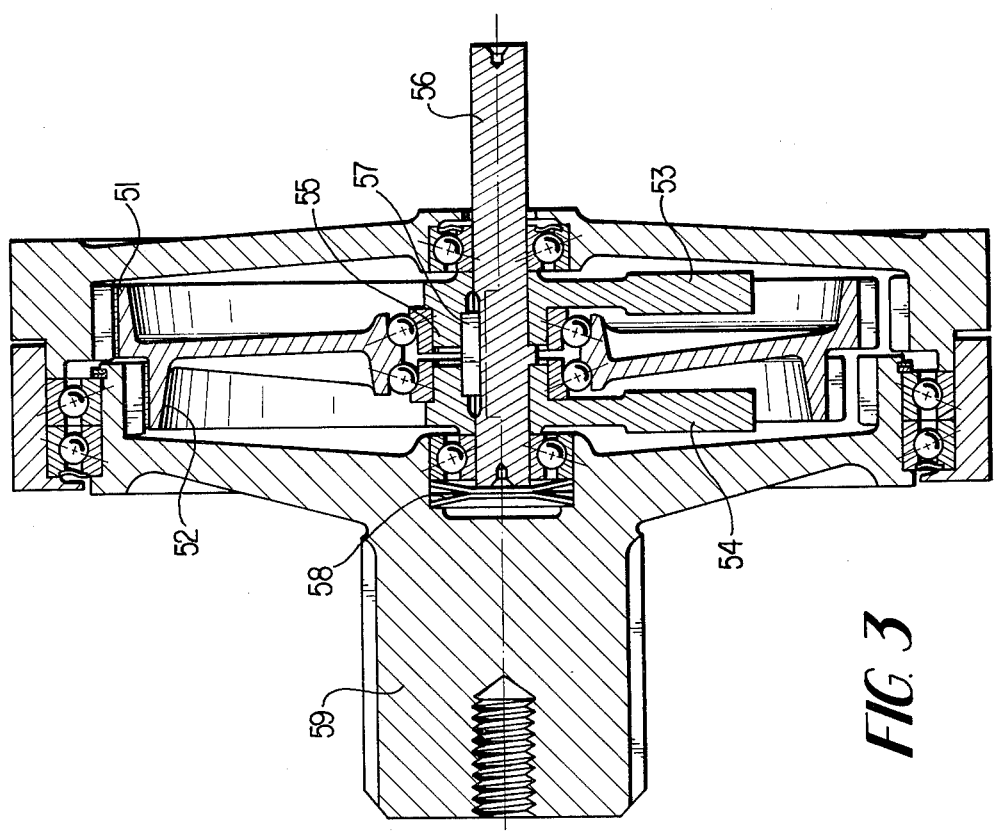
FIG. 3 is a longitudinal vertical section of a second embodiment of the present invention.

In the embodiment as shown in FIG. 1, the counterweight 14 is located internally between the primary 21 and secondary 22 gears. In an alternative embodiment, as shown in FIG. 3, the primary 51 and secondary 52 gears are integrally formed with an opening on either side to accommodate counterweights 53, 54 which together provide a balanced system. The embodiment of FIG. 3 shows the eccentric 55 formed as two sections, and with each of the counterweights 53, 54 formed as an integral unit with one of these sections. A keyway is located in the input shaft 56 between the two sections of the eccentric 55, and a key 57 is positioned within the keyway. This key 57 maintains both sections of the eccentric 55 in alignment and transfers the torque existing at the input shaft to the system. A spring washer 58 is provided adjacent the inner end of the input shaft 56. The entire system is preloaded by the spring washer 58, so that each component along the shaft 56 can be axially shifted to equalize the preloading distribution.

Referring to FIGS. 1 and 2, the teeth 23, 24 of the primary gear 21 and fixed gear spline 25, as well as the teeth 27, 28 of the secondary gear 22 and output gear spline 29 are of identical size and shape. The primary gear 21 has a smaller number of teeth than the fixed gear spline 25 with which it is in engagement, with the result that the external diameter of the primary gear 21 is less than that of the fixed gear spline 25. Similarly, the secondary gear 22 has a smaller number of teeth than the output gear spline 29 with which it is in engagement, with the result that the external diameter of the secondary gear 22 is less than that of the output gear spline 29.

In constructing the speed reducing device of the present invention, it has been found to be highly advantageous to employ gear teeth having a 30 degree contact pressure angle, as shown in FIG. 2. Such a pressure angle has been found to aid materially in reducing noise and vibrations within the system. Thus a 30° contact pressure angle provides a marked improvement over conventional tooth pressure angles of 14½° and 20°.

The difference in the number of teeth between the primary gear 21 and the secondary gear 22 defines the gear ratio and the direction of rotation of the output shaft relative to the input shaft. Generally, more than one tooth of the primary gear 21 will be in engagement with the teeth of the fixed gear spline 25 at any time during rotation of the gear 21, and the same is true for the relationship between the secondary gear 22 and the output gear spline 29. As an example of the specific numbers of teeth which may be employed in the system of the present invention, a fixed gear spline 25 having 78 teeth and a primary gear 21 having 75 teeth, together with an output gear spline 29 having 72 teeth and a secondary gear 22 having 69 teeth, produces a speed reducing device having a reduction ratio of 300:1.

In FIG. 4, there is shown an embodiment of the present invention having a tapered input shaft 61 formed integrally with an eccentric 62. The input shaft 61 is mounted within a fixed gear spline 63 formed as a unit with a cover 64. The entire assembly is shown as being installed by means of bolts 65 within a vertical partition 64 such as a bulkhead of a ship. The input end of the shaft 61 is mounted to rotate within a double preloaded bearing assembly 67, and installed on the shaft 61 is a sprocket 68, for use such as with a timing belt. The opposite end of the input shaft 61 is mounted within two sets 69, 70 of roller bearings, these bearings 69, 70 being contiguous with the cover 64 and transformer gear component 71, respectively. The transformer gear component 71 includes a primary 72 and secondary 73 gear formed integrally and with an opening being provided outwardly of the transformer gear component 71 to accommodate a counterweight 74 which is connected by a bolt 75 and pins 76 to the outer end of the input shaft 61. A removable weighted member 77 is secured to the counterweight 74 by a locking screw 78.

In the embodiment of FIG. 4, the rotatable output gear spline 79 is mounted on a pair of preloaded bearing assemblies 80 installed on the outer periphery of the fixed spline 63. A cover 81 is attached by bolts to the outer surface of the rotatable spline 79, with sufficient space being provided between the cover 81 and the counterweight 74 to allow the counterweight 74 to rotate freely with the input shaft 61. The rotatable spline 79 as shown is formed as a sprocket to receive an anchor chain 82, with which the system of the present invention can be advantageously employed.

The primary gear 72 is shown as having a smaller diameter than the secondary gear 73 in the embodiment of FIG. 4. Thus, the rotatable output gear spline 79 will rotate in the opposite direction from the direction of rotation of the input shaft 61 in this embodiment.

The speed reducing system of the present invention may be employed to meet power transmission requirements in an environment in which large speed reductions, high torque capacities, extremely low backlash and accurate angular positioning are desirably combined with minimum size, weight and noise. In addition, the present invention features longer life and greater dependability for the various components of the system, compared with speed reducing systems of the prior art, together with simplicity of construction and a system which is virtually free of noise and vibration. The reduction gear system of the present invention is capable of handling power requirements from fractions of a horsepower up to several thousand horsepower.

It is thought that the invention and many of its attendant advantages will be understood from the foregoing description, and it will be apparent that various changes may be made in the form, construction and arrangement of the parts without departing from the spirit and scope of the invention of sacrificing all of its material advantages, the forms hereinbefore described being merely the preferred embodiments thereof.

It is claimed:
1. A speed reducing device, comprising: an input shaft; an output transmitting member journaled in axial alignment with said input shaft; an eccentric and a counterweight carried by the input shaft, the center of gravity of the counterweight lying on a line which extends from the input shaft diametrically opposite to a line from the input shaft to the center of gravity of the eccentric; a primary and a secondary gear mounted upon the eccentric for rotation together about said input shaft, said primary gear having a different number of teeth than said secondary gear, the primary and secondary gears being axially spaced along the input shaft to form a cavity and the counterweight being disposed within the cavity between said primary and secondary gears; a fixed gear spline in engagement with said primary gear, the primary gear having a smaller number of teeth than the fixed gear spline; said output transmitting member including a rotatable output gear spline in engagement with said secondary gear, the secondary gear having a smaller number of teeth than the output gear spline; a casing secured to said fixed gear spline; a bearing assembly mounted between said casing and said rotatable output gear spline in a direct straight line with the lines of force transferred by the gear teeth which are in mesh, said output gear spline being in direct engagement with said fixed gear spline through said casing and said bearing assembly, said casing and bearing assembly being located radially outwardly from said secondary gear to thereby achieve a short, compact, stiff torque path which extends from the fixed gear spline through the periphery of the primary and secondary gears to the output gear spline.

2. The device of claim 1 wherein the primary and secondary gears ar integrally joined, and wherein a single counterweight is carried by said input shaft.

3. The device of claim 1, wherein said output transmitting member includes an output shaft.

4. The device of claim 1 wherein the primary gear has a greater number of teeth than the secondary gear.

5. The device of claim 1 wherein the primary and secondary gears are spur gears.

6. The device of claim 1 wherein the counterweight is provided with at least one removably mounted member for adjusting the amount of weight carried by the counterweight.

7. The device of claim 1 wherein said input shaft is mounted on preloaded bearings.

8. The device of claim 1 wherein said primary and secondary gears are mounted upon the eccentric on preloaded bearings.

9. The device of claim 1 wherein the output transmitting member is mounted on a pair of preloaded peripheral bearings.

10. The device of claim 1 wherein the teeth of said gears have a contact pressure angle of 30°.

* * * * *